US008515912B2

(12) United States Patent
Garrod et al.

(10) Patent No.: US 8,515,912 B2
(45) Date of Patent: Aug. 20, 2013

(54) SHARING AND DECONFLICTING DATA CHANGES IN A MULTIMASTER DATABASE SYSTEM (75) Inventors: John Kenneth Garrod, Palo Alto, CA (US); John Antonio Carrino, Menlo Park, CA (US); Katherine Brainard, East Palo Alto, CA (US); Jacob Scott, Berkeley, CA (US); Allen Chang, Mountain View, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 195 days.

(21) Appl. No.: 12/836,801

(22) Filed: Jul. 15, 2010

(65) Prior Publication Data
US 2012/0016849 A1    Jan. 19, 2012

(51) Int. Cl.
*G06F 17/30* (2006.01)

(52) U.S. Cl.
USPC .......................................... 707/638

(58) Field of Classification Search
USPC ............... 707/610, 721, 768, 638, 634, 637, 707/635, 627, 631
See application file for complete search history.

(56) References Cited

U.S. PATENT DOCUMENTS

| 5,548,749 | A |   | 8/1996  | Kroenke et al. |              |
|-----------|---|---|---------|----------------|--------------|
| 5,708,828 | A |   | 1/1998  | Coleman        |              |
| 5,765,171 | A |   | 6/1998  | Gehani et al.  |              |
| 6,098,078 | A | * | 8/2000  | Gehani et al.  | 707/610      |
| 6,216,140 | B1| * | 4/2001  | Kramer         | 715/234      |
| 6,317,754 | B1| * | 11/2001 | Peng           | 707/610      |
| 6,374,252 | B1|   | 4/2002  | Althoff et al. |              |
| 6,539,381 | B1| * | 3/2003  | Prasad et al.  | 1/1          |
| 6,560,620 | B1| * | 5/2003  | Ching          | 715/229      |
| 7,437,664 | B2| * | 10/2008 | Borson         | 715/234      |
| 7,676,788 | B1| * | 3/2010  | Ousterhout et al. | 717/106   |
| 8,290,990 | B2|   | 10/2012 | Drath et al.   |              |
| 8,316,060 | B1|   | 11/2012 | Snyder et al.  |              |
| 2003/0084017 | A1 |  | 5/2003 | Ordille        |              |
| 2004/0103124 | A1 | * | 5/2004 | Kupkova       | 707/203      |
| 2004/0111390 | A1 | * | 6/2004 | Saito et al.  | 707/1        |
| 2005/0193024 | A1 |  | 9/2005 | Beyer et al.  |              |
| 2006/0155945 | A1 |  | 7/2006 | McGarvey      |              |
| 2007/0005707 | A1 |  | 1/2007 | Teodosiu et al. |            |

(Continued)

OTHER PUBLICATIONS

Notification of Transmittal of the International Search Report and the Written Opinion of the International Searching Authority, or the Declaration received in Application No. PCT/US11/43794 dated Feb. 24, 2012 (9 pages).

Current Claims of PCT Application No. PCT/US11/43794 dated Feb. 2012 (6 pages).

The International Bureau of WIPO Switzerland, "Written Opinion and Search Report", in application No. PCT/US2011/043794 dated Jan. 24, 2013, 5 pages.

(Continued)

*Primary Examiner* — Sherief Badawi
(74) *Attorney, Agent, or Firm* — Hickman Palermo Truong Becker Bingham Wong LLP; Adam C. Stone (57) ABSTRACT

A computer-based method and system for sharing and deconflicting data changes amongst a plurality of replication sites. In a particular embodiment, data changes at sites to data objects are tracked by each site on a per-data object basis using per-data object version vectors. In another particular embodiment, data changes at sites to links connecting two data objects are tracked by each site on a per-link set basis using per-link set version vectors. In another particular embodiment, per-object version vectors are used to detect a conflict resulting from concurrent changes at two or more sites in which one of the concurrent changes includes an object resolution change.

8 Claims, 7 Drawing Sheets

(56) References Cited

U.S. PATENT DOCUMENTS

| | | |
|---|---|---|
| 2007/0026373 A1 | 2/2007 | Suriyanarayanan et al. |
| 2007/0112887 A1 | 5/2007 | Liu et al. |
| 2007/0168516 A1 | 7/2007 | Liu et al. |
| 2007/0180075 A1 | 8/2007 | Chasman et al. |
| 2007/0220067 A1 | 9/2007 | Suriyanarayanan et al. |
| 2007/0220328 A1 | 9/2007 | Liu et al. |
| 2007/0299887 A1 | 12/2007 | Novik et al. |
| 2008/0033753 A1* | 2/2008 | Canda et al. .................. 705/2 |
| 2008/0086718 A1* | 4/2008 | Bostick et al. ............... 717/120 |
| 2008/0320299 A1 | 12/2008 | Wobber et al. |
| 2009/0199090 A1* | 8/2009 | Poston et al. ............... 715/255 |
| 2012/0005159 A1 | 1/2012 | Wang et al. |

OTHER PUBLICATIONS

Current Claims in application No. PCT/US2011/043794 dated Jan. 2013, 6 pages.
U.S. Appl. No. 13/076,804, filed Mar. 31, 2011, Final Office Action.
U.S. Appl. No. 13/686,750, filed Nov. 27, 2012, Notice of Allowance.
European Search Report, EP Application No. 13152370.6—1951, dated Jun. 3, 2013, 8 pages.
Claims from EP Application No. 13152370.6, dated Jun. 2013, 5 pages.
D. Scott Parker, Jr. et al., "Detection of Mutual Inconsistency in Distributed Systems" IEEE Transactions in Software Engineering, XP 000654801, May 1993, 8 pages.

\* cited by examiner

SHARING AND DECONFLICTING DATA CHANGES IN A MULTIMASTER DATABASE SYSTEM

TECHNICAL FIELD

The present disclosure generally relates to distributed computing systems and, in particular, to sharing and deconfliction of data changes in a multi-master database system.

BACKGROUND

In a multimaster database system, data is stored in a group of databases, data changes may be made to any member of the group, and data changes made to one member are propagated to the rest of the group. Multimaster database systems typically employ either a "synchronous" or an "asynchronous" replication scheme for propagating a change made to one database to the rest of the databases in the group.

In synchronous multimaster replication, each change is applied to all databases in the group immediately or to none of the databases if one or more of the databases in the group cannot accept the change. For example, one of the databases may be offline or unavailable. Synchronous multimaster replication is typically achieved using a two-phase commit protocol.

In contrast, in "asynchronous" multimaster replication, a change made to a database is immediately accepted by the database but propagation of the change to other databases in the group may be deferred. Because propagation of changes may be deferred, if one or more of the databases in the group are unavailable, the available databases can still accept changes, queuing the changes locally until they can be propagated. For this reason, multimaster database systems employing an asynchronous replication strategy are considered to be more highly available than multimaster database systems employing a synchronous replication strategy. However, asynchronous replication raises the possibility of conflicts that occur as a result of concurrent database changes.

A conflict can arise in a multimaster database system when the same data is changed in two different databases before either one of those changes can be propagated to the other. For example, assume that in database A data representing a particular person's eye color is changed to "brown", and after that change but before that change can be propagated to database B data in database B representing the particular person's eye color is changed to "green". Without additional information, it is unclear which change is the "correct" change that should be adopted by all databases in the system.

Multimaster database systems employing an asynchronous replication scheme typically provide mechanisms for "deconflicting" conflicts. As used herein, the term "deconflict", refers generally to detecting and resolving a conflict such that a resolution of the conflict is eventually adopted by all databases in the system. In some cases, the multimaster database system may be able to deconflict automatically without requiring user intervention. In other cases, user intervention may be required to determine which of the concurrent changes should be adopted.

In multimaster database systems employing asynchronous replication, when conflicts are detected has an enormous effect on the integrity of database data. For example, some database systems may support "object resolution". Object resolution involves a user or an automated computing process determining that two or more separate data objects actually represent the same real-world entity and invoking a function of the database system so that the separate data objects are resolved into a single data object. For example, assume there are two separate data objects, one having a name property value of "John Smith", the other having a name property value of "J. S.". A user may decide that these two data objects both represent the same real-world person. Accordingly, in a database system that supports object resolution, the user may invoke a function of the database system so that the two separate data objects are resolved to a single data object having a name property value of "John Smith" or "J.S." as selected by the user resolving the objects together.

In multimaster database systems employing asynchronous replication, it would be desirable to detect as a conflict concurrent changes that include an object resolution change. For example, assume that in database A, User 1 changed the hair color property of a data object representing a person named "J.S." from "brown" to "blonde". Further assume that before the hair color change made by User 1 can be propagated from database A to database B that User 2 changes database B by resolving together the data object representing "J.S." with another data object representing a person named "John Smith". It would be desirable for the multimaster database system to detect these two concurrent changes as a conflict as User 2 may not have decided to resolve "J.S." and "John Smith" together if User 2 had known that John Smith's hair color was changed by User 1. Similarly, User 1 may not have decided to change the hair color of "J.S." had User 1 known that User 2 resolved "J.S." and "John Smith" together.

What is a needed then is a multimaster database system employing asynchronous replication that detects conflicts resulting from concurrent changes in a manner that is in line with user expectations and that handles the deconfliction and propagation of such changes appropriately. Embodiments of the present invention fulfill these and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Introduction

Referring to the figures, exemplary embodiments of the invention will now be described. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Further, in the following description, for the purposes of explanation, numerous specific details are set forth in order to provide a thorough understanding of the present invention. It will be apparent, however, that the present invention may be practiced without these specific details. In other instances, block diagrams include well-known structures and devices in order to avoid unnecessarily obscuring the present invention.

Overview

According to one or more embodiments of the present invention, a multimaster database system and computer-based method therein provide sharing and deconfliction of data changes amongst a plurality of replication sites.

In a particular embodiment, data changes at sites to data objects are tracked by each site on a per-data object basis using per-data object version vectors. The method includes a first computing device at a first site making a change to a data object. The first computing device shares the change to the data object with one or more other sites. A second computing device at a second site receives an update reflecting the change to the data object made by the first computing device at the first site. The update includes an identification of the data object, data reflecting the change to the data object, and a version vector for the data object at the first site. The second computing device obtains a version vector for the data object at the second site and compares the version vector of the data object at the first site to the version vector of the data object at the second site to determine whether the two version vectors are identical, ordered, or concurrent. Based on this comparison, the second site either attempts to automatically deconflict the two versions of the data object if, according to their version vectors, they are concurrent, or automatically incorporates the received update into the second site's copy of the data object if, according to their version vectors, the version of the data object at the second site is ordered before the version received in the update.

In another particular embodiment, data changes at sites to links connecting two data objects are tracked on a per-link set basis using per-link set version vectors. The method includes a first computing device at a first site making a change to a set of links connecting two data objects. The first computing device shares the change to the link set with one or more other sites. A second computing device at a second site receives an update reflecting the change to the link set made by the first computing device at the first site. The update includes an identification of the link set and a version vector for the link set at the first site. The second computing device obtains a version vector for the link set at the second site and compares the version vector for link set at the first site to the version vector of the link set at the second site to determine whether the two version vectors are identical, ordered, or concurrent. Based on this comparison, the second site either attempts to automatically deconflict the two versions of the link set if, according to their version vectors, they are concurrent, or automatically incorporates the received update into the second site's copy of the link set if, according to their version vectors, the version of the link set at the second site is ordered before the version received in the update.

In another particular embodiment, per-object version vectors are used to detect a conflict resulting from concurrent changes at two or more sites in which at least one of the concurrent changes includes an object resolution change. The method includes a first computing device at a first site of the plurality of sites resolving two or more data objects together via an object resolution feature of a database system or database application. The first computing device shares the resolution change with one or more other sites of the plurality of sites. A second computing device receives an update reflecting the resolution change made by the first computing device at the first site. The update includes an identification of each of the two or more data objects that were resolved together, and, for each of the two or more data objects, a version vector of the data object at the first site. The second computing device obtains, for each of the two or more data objects, a version vector of the data object at the second site. The second computing device compares, for each of the two or more data objects, the version vector of the data object at the first site to the version vector of the data object at the second site to determine whether the two versions are identical, ordered, or concurrent. In response to the second computing device determining that the version vector of at least one data object of the two or more data objects at the first site is concurrent with the version vector of the at least one data object at the second site, the second computing device determines that the resolution change made by the first computing device at the first site conflicts with the version of the at least one data object at the second site.

Other embodiments include, without limitation, a computer-readable non-transitory medium that includes processor-executable instructions that enable a processing unit to implement one or more aspects of the disclosed methods as well as a system configured to implement one or more aspects of the disclosed methods.

Multimaster Database System with Deconfliction Engine

Figure 1:
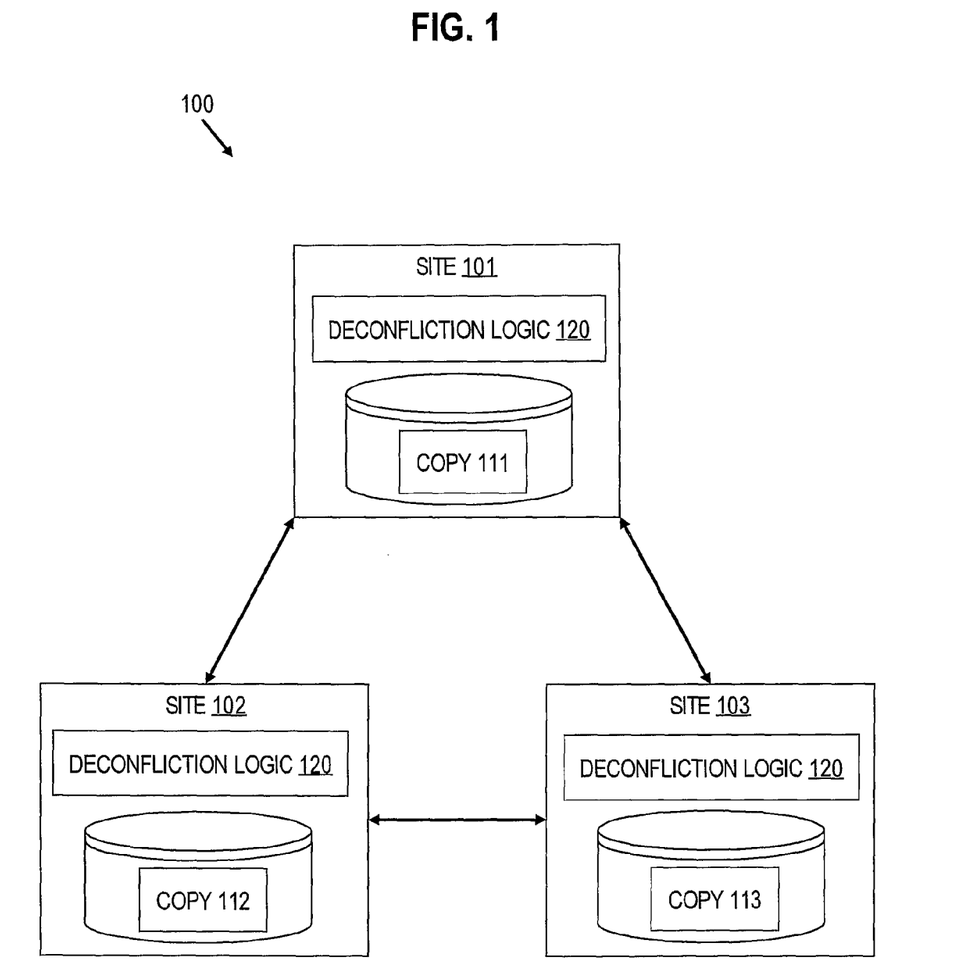
FIG. 1 illustrates a multimaster database system for use in sharing and deconflicting data changes amongst a plurality of replication sites according to an embodiment of the invention.

FIG. 1 illustrates a multimaster database system 100 for use in sharing and deconflicting data changes amongst a plurality of replication sites according to an embodiment of the invention. In one embodiment, sites 101, 102, and 103 are coupled through one or more data networks such as the Internet, one or more wide area networks (WANs), one or more local area networks (LANs), one or more network communication buses, or some combination thereof. It is not necessary that a highly or continuously available data network exist between replication sites and the data network(s) connecting any two sites may only be periodically available. In another embodiment, one or more of the sites are not connected to any other site in the system and data is transported to and from these sites manually using portable media or a portable media device as such as a Compact Disc (CD), a Digital Versatile Disc (DVD), Universal Serial Bus (USB) flash device, etc.

Each site 101, 102, and 103 may comprise one or more networked computing devices such as one or more workstation computers, server computers, laptop computers, mobile computing devices, or combinations thereof connected to each other via one or more data networks. Further, while only three sites are shown in FIG. 1, multimaster database system 100 may comprise many hundreds or even many thousands of geographically distributed sites.

According to one embodiment, each site 101, 102, and 103 each have copies 111, 112, and 113 of the same body of data. The body of data may be, for example, one or more tables in a relational database. However, embodiments of the invention are not limited to relational databases and any type of database capable of supporting the conceptual data model described herein may be used. Non-limiting examples of types of databases capable of supporting the conceptual data model described herein include relational databases, hierarchical databases, and object-oriented databases.

With respect to that particular body of data, site 101 may be configured to asynchronously propagate to site 102 changes made to copy 111, and asynchronously propagate to site 103 changes made to copy 111. Similarly, site 102 may be configured to asynchronously propagate to site 101 changes made to copy 112, and asynchronously propagate to site 103 changes made to copy 212. Site 103 may be configured to asynchronously propagate to both sites 101 and 102 changes made to copy 113. However, it is not necessary that each site be configured to propagate to every other site changes made to its copy of the body of data. In other words, a full-meshed multimaster site topology is not required to implement embodiments of the invention and partially-meshed or cascading multimaster topologies may be used.

As system 100 employs an asynchronous replication scheme, each copy 111, 112, and 113 of the body of data is loosely consistent with the other copies. That is, each copy may diverge from time to time such that at any given moment one copy's view of the body of data may be different from another copy's view of the body of data. In the absence of new changes, the copies are expected to eventually become consistent with one another. Thus, as well as being loosely consistent with one another, the copies 112, 112, 113, etc. can also be said to be eventually consistent.

Each site 101, 102, and 103 has deconfliction logic 120 for receiving remote changes to the body of data from other sites, detecting conflicts, deconflicting detected conflicts either automatically or with user assistance, and sharing local changes to the body of data with other sites. Deconfliction logic 120 may be implemented as one or more computer software programs, one or more field programmable logics, hard-wired logic, or a combination thereof. In one embodiment, deconfliction logic 120 is a software component of a database management system such as those commercially available from the Oracle Corporation of Redwood Shores, Calif. and the Microsoft Corporation of Redmond Wash. In another embodiment, deconfliction logic 120 is software component of a web-based, server-based or desktop application that uses a database management system for performing the deconfliction techniques described herein. In yet another embodiment, deconfliction logic 120 is implemented in part by a web-based, server-based or desktop application and in part by a database management system.

As used herein, the term "change", unless otherwise apparent from the surrounding text, refers to an addition, edit, or deletion to a copy of the body of data at a site. A change can be initiated by a user or a computing process. In addition, a change can also be initiated by deconfliction logic 120 in response to receiving notification of a previous change made at a site different from the site receiving the notification.

As used herein, the term "update", unless otherwise apparent from the surrounding text, refers to information about a change that is sent from the site that made the change to another site. Each change may result in an update being received by every other site so that the other sites can incorporate the change into their respective copies of the body of data. Reception of an update at a site may raise a conflict with the receiving site's copy of the body of data. Techniques implemented by deconfliction logic 120 for detecting and deconflicting conflicts in various scenarios are described in greater detail below.

Object-Centric Data Model

In one embodiment, the body of data, of which each site 101, 102, and 103 maintains a copy of, is conceptually structured according to an object-centric data model. It should be understood that this conceptual data model is independent of any particular database data model that may be used for storing a copy of the body of data at a site. For example, each object of the conceptual data model may correspond to one or more rows in a relational database or an entry in Lightweight Directory Access Protocol (LDAP) database.

Figure 2:
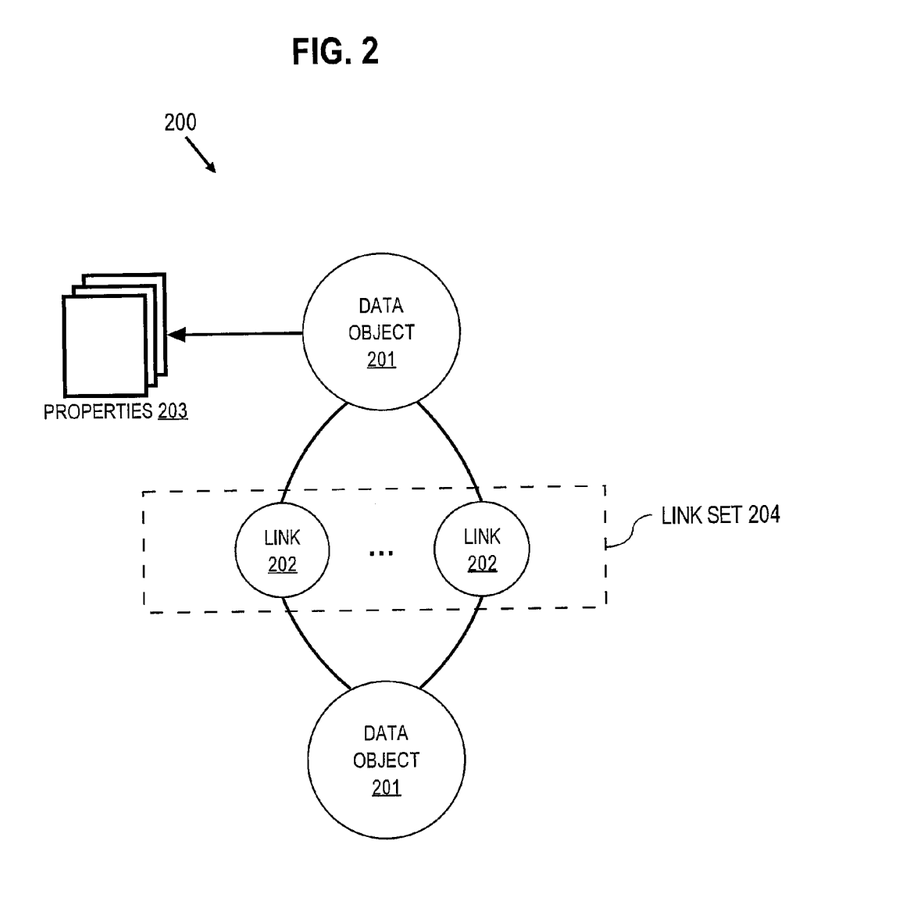
FIG. 2 illustrates an object-centric conceptual data model according to an embodiment of the invention.

FIG. 2 illustrates an object-centric conceptual data model 200 according to an embodiment. Model 200 is centered on the notion of a data object 201. At the highest level of abstraction, data object 201 is a container for information representing things in the world. For example, data object 201 can represent an entity such as a person, a place, an organization, or other noun. Data object 201 can represent an event that happens at a point in time or for a duration. Data object 201 can represent a document or other unstructured data source such as an e-mail message, a news report, or a written paper or article. At a minimum, each data object 201 is associated with a unique identifier that uniquely identifies the data object within system 100. Each data object 201 may also have a type (e.g., Person, Event, or Document) and a display name which may be the value of a particular property of the data object.

Each data object 201 may have one or more properties 203. Properties 203 are attributes of the data object 201 that represent individual data items. At a minimum, each property 203 of a data object 201 has a type and a value. Different types of data objects may have different types of properties. For example, a Person data object might have an Eye Color property and an Event object might have a Date property. In one embodiment, the set of data object types and the set of property types for each type of data object supported by the system 100 are defined according to a pre-defined or user-defined ontology or other hierarchical structuring of knowledge through sub-categorization of object types and property types according to their relevant and/or cognitive qualities. In addition, data model 200 may support property multiplicity. In particular, a data object 201 may be allowed to have more than one property 203 of the same type. For example, a Person data object might have multiple Address properties or multiple Name properties.

Each link 202 represents a connection between two data objects 201. In one embodiment, the connection is either through a relationship, an event, or through matching properties.

A relationship connection may be asymmetrical or symmetrical. For example, Person data object A may be connected to Person data object B by a Child Of relationship (where Person data object B has an asymmetric Parent Of relationship to Person data object A), a Kin Of symmetric relationship to Person data object C, and an asymmetric Member Of relationship to Organization data object X. The type of relationship between two data objects may vary depending on the types of the data objects. For example, Person data object A may have an Appear In relationship with Document data object Y or have a Participate In relationship with Event data object E.

As an example of an event connection, two Person data objects may be connected by an Airline Flight data object representing a particular airline flight if they traveled together on that flight, or by a Meeting data object representing a particular meeting if they both attended that meeting. In one embodiment, when two data objects are connected by an event, they are also connected by relationships, in which each object has a specific relationship to the event, such as, for example, an Appears In relationship.

As an example of a matching properties connection, two Person data objects representing a brother and a sister, may both have an Address property that indicates where they live. If the brother and the sister live in the same home, then their Address properties likely contain similar, if not identical information. In one embodiment, a link between two data objects may be established based on similar or matching properties of the data objects.

The above are just some examples of the types of connections that may be represented by a link and other types of connections may be represented. Thus, it should be understood that embodiments of the invention are not limited to any particular types of connections between data objects. For example, a document might contain two different tagged entities. A link between two data objects may represent a connection between these two entities through their co-occurrence within the same document.

Each data object 201 can have multiple links with another data object 201 to form a link set 204. For example, two Person data objects representing a husband and a wife could be linked through a Spouse Of relationship, a matching property (Address), and an event (Wedding).

In one embodiment, data model 200 supports object resolution. As mentioned above, object resolution includes a user or an automated computing process determining that two or more separate data objects 201 actually represent the same real-world entity and invoking a function of the system 100 at a site 101, 102, 103, etc. so that the separate data objects appear to users of the system 100 as if they were a single data object. In one embodiment, when one data object 201 is resolved together with another data object 201 the properties and links of one data object are copied to the other data object and then deleted from the data object from which they were copied. However, both data objects are still retained by the system. As well as facilitating the ability to un-resolve data objects that were previously resolved together, retaining data objects after resolving them together facilitates detection and deconfliction of conflicts as described in greater detail below.

Per-Data Object Version Vectors

A version vector is known mechanism for tracking changes in distributed systems. However, version vectors are typically employed on a per-site basis. That is, with typical implementations of version vectors in distributed systems, each site uses a single version vector to track all changes made to the copy of the database maintained by that site.

In accordance with an embodiment of the invention, in order to track and to deconflict changes to the body of data, each site 101, 102, 103, etc. maintains version vectors on a per-data object basis. By doing so, conflicts involving changes to properties of data objects and conflicts involving object resolution changes can be appropriately detected and deconflicted as explained in greater detail below.

In one embodiment, each site maintains one version vector for each data object managed by the system. Thus, for a system having m sites managing n data objects, each site will maintain n version vectors for a total of m*n version vectors maintained by all m sites. Each version vector may contain up to m elements, one for each of the m sites. Each element of a version vector holds a value representing a logical clock for the associated data object at the site corresponding to the element. In a practical embodiment, to conserve data storage space, data maintained at a site representing a version vector may not represent all m elements, but instead some subset of the m elements. For example, elements of a version vector that have a default value may not be represented.

Each site has, in each version vector that the site maintains, its own logical clock value as one of the elements. This logical clock value represents the version of the associated data object at the site maintaining the version vector. Each other element in the version vector represents the site's best guess based on the updates the site has received of the version of the associated data object at the site corresponding to the other element.

In one embodiment, each element of a version vector is set to some initial value (e.g., zero). When a site changes one or more properties of a data object in a database transaction against the site's copy of the body of data, the site increments its own logical clock in the version vector associated with the data object by a fixed value (e.g., one). When sharing the change with other sites as an update, the site includes in the update data representing the change to the data object and data representing the site's version vector for the data object after the increment. A site receiving the update can compare the version vector in the update with its own version vector for the data object to determine whether the version of the data object at the receiving site and the version of the data object in the update are: (1) identical, (2) ordered, or (3) concurrent.

Known techniques for comparing two version vectors to determine whether the two versions are identical, ordered, or concurrent can be used. In one embodiment, comparing two version vectors includes comparing each element in one version vector with the corresponding element in the other version vector. Correspondence between elements is determined based on the site the elements correspond to. In particular, the element for a site in one version vector is compared against the element for the same site in the other version vector. Two versions are identical if each element in one version vector equals the corresponding element in the other version vector. The two versions are ordered if one version "happened before" the other. Version vector A happened before version vector B if each element in version vector B is greater than or equal to the corresponding element in version vector A and at least one element in the version vector B is greater than the corresponding element in version vector A. Similarly, version vector B happened before version vector A if each element in version vector A is greater than or equal to the corresponding element in version vector B and at least one element in the version vector A is greater than the corresponding element in version vector B. Two versions are concurrent if they are neither identical nor ordered.

Sharing Changes to Data Objects Using Per-Object Version Vectors

Figure 3:
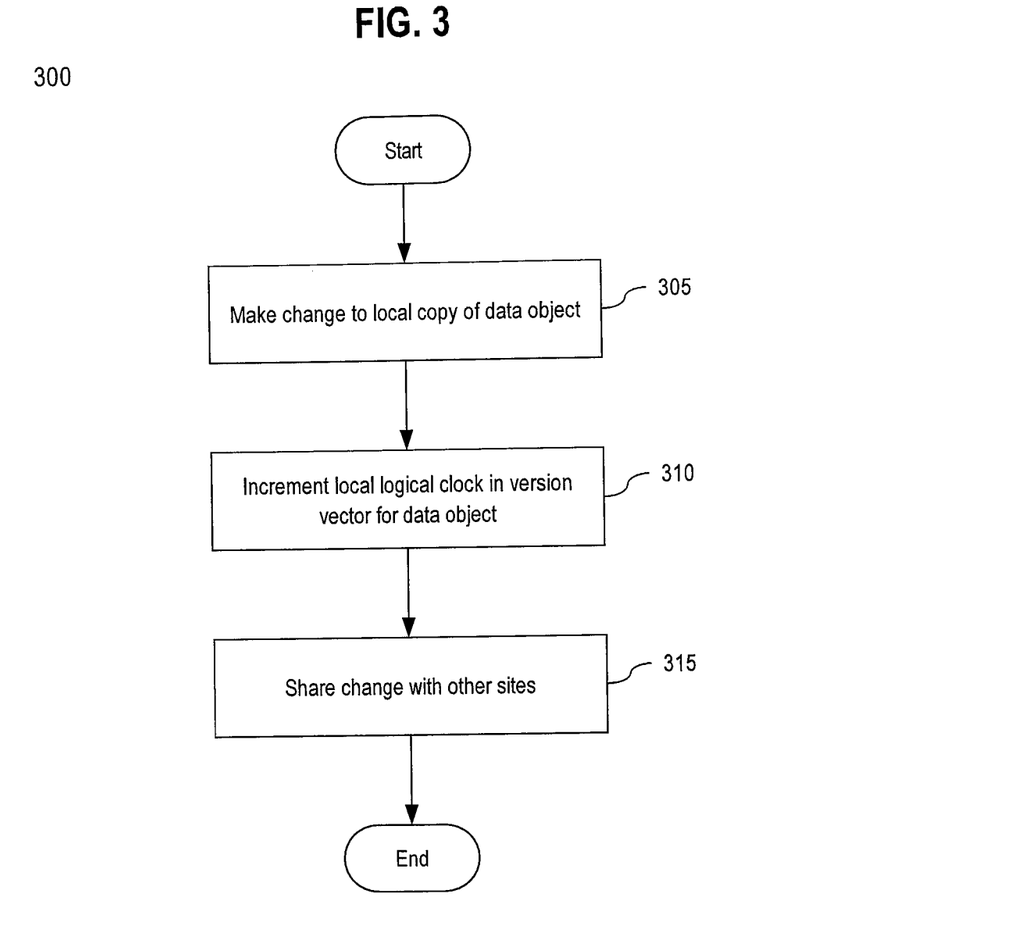
FIG. 3 illustrates a method for sharing a data change to a data object in a multimaster database system using per-object version vectors, according to an embodiment of the invention.

FIG. 3 illustrates a method 300 for sharing a data change to a data object in a multimaster database system using per-object version vectors, according to an embodiment of the invention. As shown, the method 300 begins at step 305 where a site makes a change to a local copy of a data object stored in the site's copy of the body of data. For example, a user may use a database application at the site to add, delete, or edit one or more properties of the data object.

In one embodiment, as part of changing a data object at a site, each change results in a new version of the data object at the site. At step 310, the site's local logical clock in the version vector for the data object is incremented by a fixed value (e.g., one) to reflect the new version of the data object at the site where the change was made. The other elements in the version vector are not incremented.

In one embodiment, each change to a data object at a site is shared with every other site in the system. Depending on the topology of the multimaster system (e.g., full-meshed or partially meshed), a site making a change may communicate with every other site to share the change, or just some subset of them that are responsible for communicating the change with other sites. At step 315, the change made at step 305 is shared with at least one other site in the system. Sharing the change includes sending, to the at least one other site, data that represents the change and data that represents the version vector for the changed data object after the increment at step 310.

In one embodiment, data that represents the change includes an identifier of the data object and a materialized representation of the data object including all properties of the data object. In another embodiment, data that represents the change includes an identifier of the data object but just the properties of the data object affected by the change. Data that represents the version vector for the changed data object need not include a representation of each element of the version vector and in a practical embodiment, data representing only a subset of all possible elements of the version vector is shared with the at least one other site.

Figure 4:
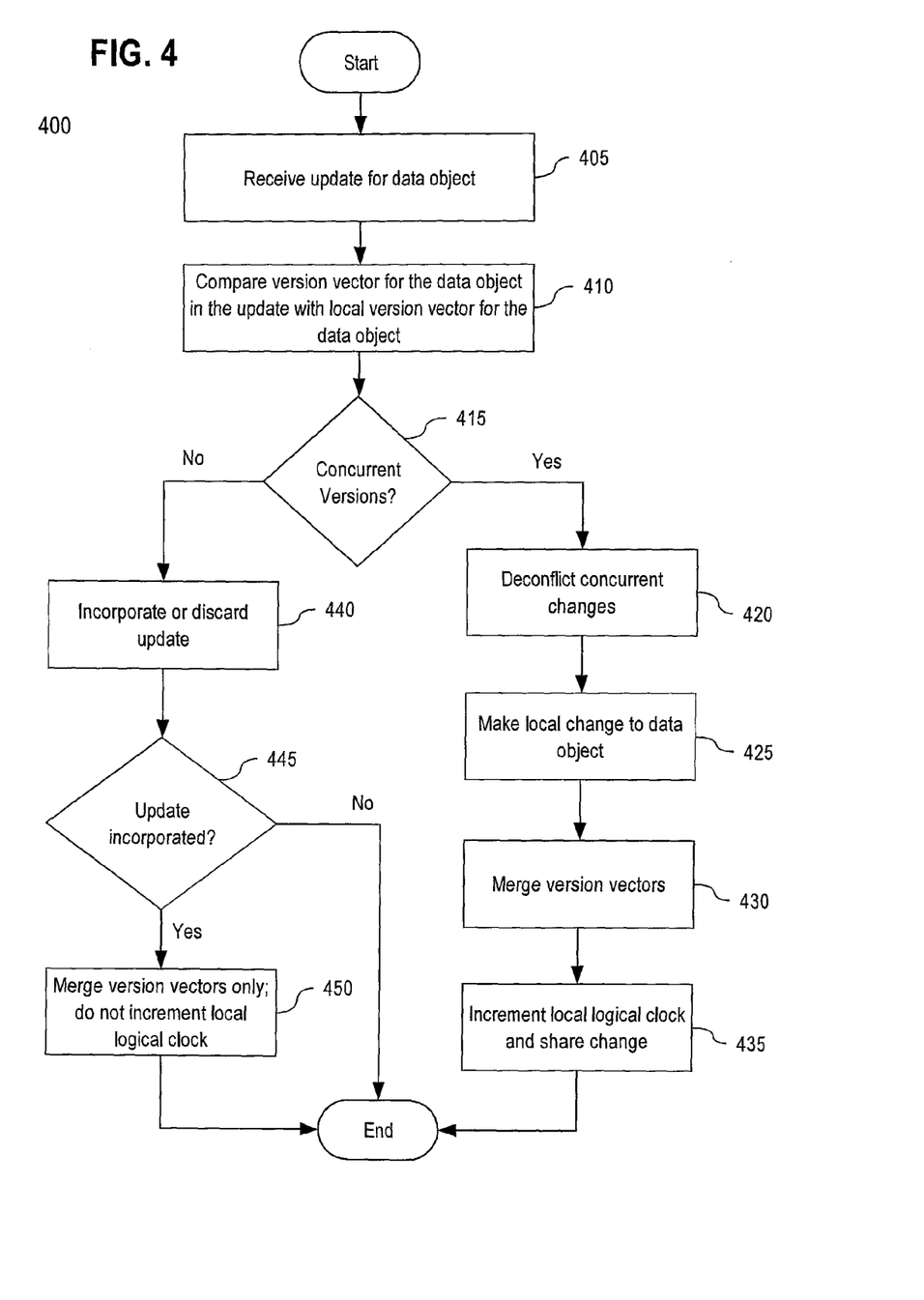
FIG. 4 illustrates a method for detecting and deconflicting a conflict involving concurrent changes to a data object using per-object version vectors, according to an embodiment of the invention.

Detecting and Deconflicting Conflicts Involving Changes to Data Objects Using Per-Object Version Vectors FIG. 4 illustrates a method 400 for detecting and deconflicting a conflict involving concurrent changes to a data object using per-object version vectors, according to an embodiment of the invention. As shown, the method 400 begins at step 405 where a site receives an update for a data object from another site. The update includes data that represents a change to the data object including an identifier of the changed data object and data that represents the version vector for the changed data object. The version vector represents the version of the data object at the site that made the change immediately after the change was made. For clarity of explanation, the version vector for the changed data object received in the update will be referred to as the changing site's version vector for the data object.

At step 410, the site receiving the update obtains locally its version vector for the data object based on the identifier of the data object included in the update and compares its version vector with the changing site's version vector to determine whether the two versions are identical, ordered, or concurrent. As mentioned above, this comparison includes comparing the changing site's version vector with the receiving site's version vector on an element by element basis.

At step 415, a determination is made whether the changing site's version for the data object received in the update and the receiving site's version vector for the data object are concurrent. If the two versions are concurrent, then a conflict has been detected. That is, the version of the data object at the receiving site reflects a change to the data object made without knowledge of the change received in the update and the version of the data object received in the update reflects a change to the data object made without knowledge of the change that the receiving site is aware of. If a conflict is detected, then the method 400 proceeds to step 420 where the concurrent changes resulting in the conflict is either automatically or manually deconflicted.

At step 420, an initial determination is made whether the conflict can be automatically deconflicted. In one embodiment, determining whether a conflict can be automatically deconflicted is based on a set of heuristics and/or deconfliction rules. The set of heuristics and/or deconfliction rules may be user defined. For example, in one embodiment, determining whether a conflict can be automatically deconflicted includes determining whether the concurrent changes involve changes to non-overlapping properties or non-overlapping property types of the data object. For example, if the change received in the update is to a Phone Number property of a particular Person data object and the change the receiving site is aware of is to an Address property of the particular data object, then the system may automatically determine that both changes can accepted. In one embodiment, non-overlapping properties are detected at the receiving site by performing a property by property comparison between the changing site's version of the data object received in the update and the receiving site's version of the data object.

If the conflict cannot be automatically deconflicted, then the receiving site holds the update in a pending update queue for the data object until it can be deconflicted with the aide of user input. For example, the receiving site may not be able to automatically deconflict a conflict if the concurrent changes involve changes to the same property of a data object. For example, if the change received in the update is to a Phone Number property of a particular Person data object and the change to the data object the receiving site is aware of is also to the Phone Number property of the particular data object, then the receiving site may not be able to automatically resolve the conflict. While an update to a data object remains in the receiving site's pending update queue for the data object, the receiving site can continue to make changes to the data object and accept and apply updates to the data object received from other sites until the user either discards or accepts the update.

In one embodiment, to help a user make an informed deconfliction decision when manually deconflicting a conflict involving concurrent changes to a data object, the deconflicting site determines the greatest common ancestor at the deconflicting site of (a) the version of the data object in the pending update queue at the deconflicting site (pending version) and (b) the current version of the data object at the deconflicting site (current version). The greatest common ancestor of these two versions is determined as the most recent version of the data object at the deconflicting site that is ordered before (i.e., happened before) both (a) the pending version of the data object and (b) the current version of the data object according to their respective version vectors. An application at the deconflicting site uses the greatest common ancestor information to present to a user the differences between both: (1) the greatest common ancestor version of the data object and the pending version and (2) the greatest common ancestor version and the current version. For example, the application may present a graphical user interface that provides a visual indication of the property-wise differences so that a user can understand the nature of the concurrent changes and indicate which version of the data object is correct. Based on presentation of the differences (1) and (2), the user can determine which one of the two versions for the data object is the correct version for the data object and provide an indication through the application of the selected version.

At step 425, the deconfliction of the concurrent changes in step 420 results in a change to the receiving site's local copy of the data object. The change to the data object reflects the result of the deconfliction. For example, if it was determined in step 420 that the concurrent changes involved non-overlapping properties, then the change made to the data object at step 425 might involve modifying the receiving site's local copy of the data object to incorporate the changed non-overlapping properties received in the update.

After the change is made to the receiving site's local copy of the data object, at step 430, the changing site's version vector for the data object is merged together with the receiving site's version vector for the data object. Merging the two version vectors includes merging each element in the changing site's version vector for the data object with the corresponding element in the receiving site's version vector for the data object. Merging two elements includes choosing the numerically greater of the two elements as the value of the element in the new version vector. What is produced by this merging at step 430 is a new version vector that is ordered after both the receiving site's version vector for the data object and the changing site's version vector for the data object. Stated otherwise, the receiving site's version vector for the data object and the changing site's version vector now both happened before the new version vector. After the two version vectors are merged, the receiving site's version vector for the data object is replaced with the new version vector which then becomes the version vector for the data object at the receiving site.

Step 435 is similar to a combination of steps 310 and 315 of method 300. At step 435, the receiving site's logical clock in the version vector for the data object is incremented by a fixed value (e.g., one) to reflect the change made at step 425 as a result of the deconfliction at step 420. The other elements in the version vector are not incremented. In addition, at step 430, the change(s) to the receiving site's copy of the data object are shared with other site(s) in the system.

If, at step 415, the receiving site determines that the changing site's version vector for the data object and the receiving site's version vector for the data object are either identical or ordered (i.e., not concurrent), then, at step 440, the receiving site either incorporates the update into the receiving site's local copy of the data object or discards the update. In one embodiment, the receiving site incorporates the update into the receiving site's local copy of the data object if the receiving site's version vector for the data object is ordered before (i.e., happened before) the changing site's version vector for the data object. Incorporating the update into the receiving site's local copy of the data object includes overwriting data object information in the receiving site's local copy with the superseding changes for the data object included in the update. In one embodiment, the receiving site discards the update if the receiving site's version vector for the data object is identical to the changing site's version vector for the data object. The receiving site may also discard the update if the changing site's version vector for the data object is ordered before (i.e., happened before) the receiving site's version vector for the data object. In this latter case, the update represents an old change that was already incorporated into and been superseded by the receiving site's version of the data object.

If, at step 435, the update was incorporated into the receiving site's local copy of the data object, then, at step 450, the changing site's version vector for the data object is merged together with the receiving site's version vector for the data object to produce a new version vector for the data object at the receiving site. Step 450 is similar to step 430. However, unlike the case where the received update to the data object is in conflict with the receiving site's version of the data object, the new version vector for the data object at the receiving site is not incremented after merging the receiving site's version vector for the data object and the changing site's version vector for the data object.

Figure 5:
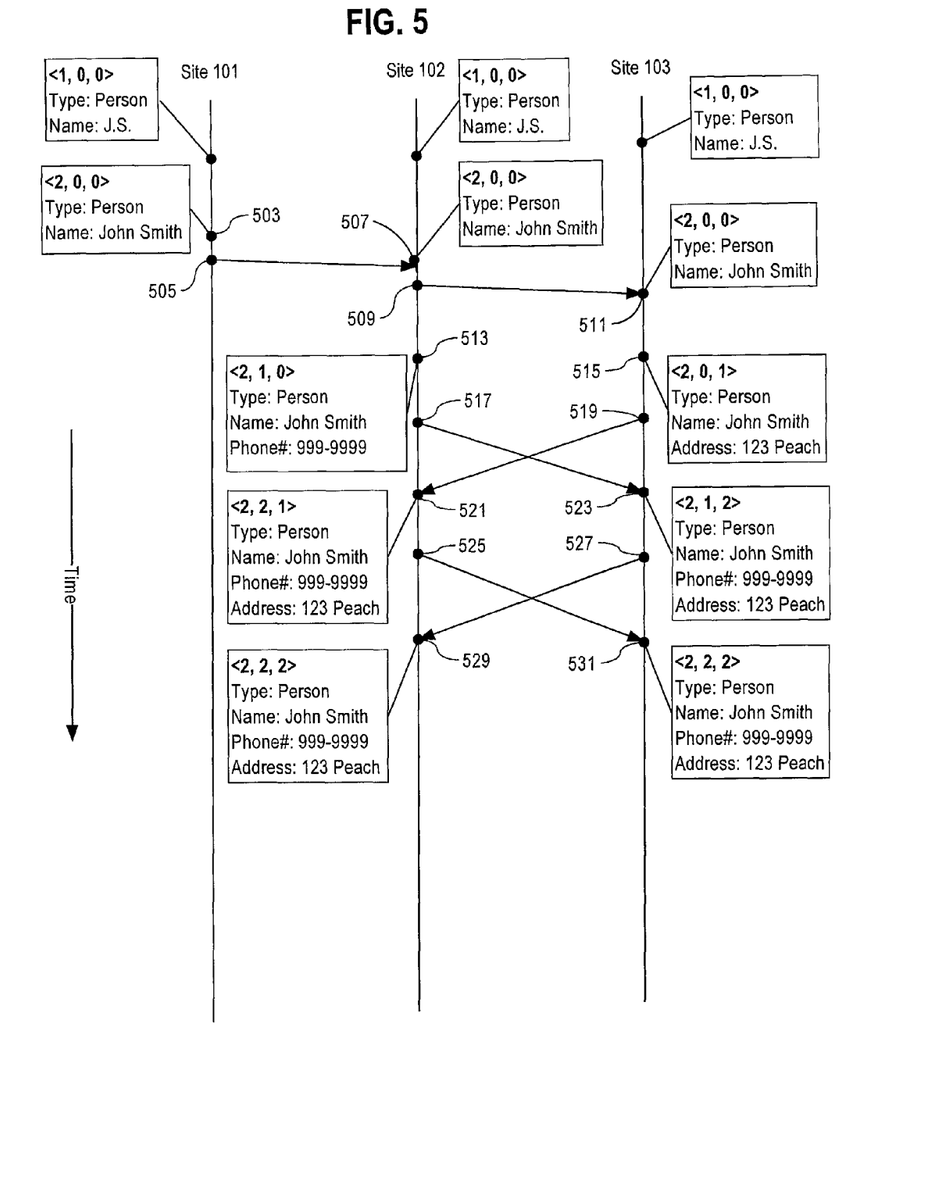
FIG. 5 illustrates an example of detecting and deconflicting a conflict involving concurrent changes to a data object using per-object version vectors according to an embodiment of the invention.

Method 300 and method 400 of FIGS. 3 and 4 will now be further explained by example with reference to FIG. 5. FIG. 5 illustrates an example of sharing and deconflicting data changes in multimaster system 100. Logical time proceeds downward from the top of the figure to the bottom as events occur at the sites 101, 102, and 103. As shown, each site 101, 102, and 103 initially has identical copies of the same data object. The data object has two attributes: a Type attribute and a Name attribute. The Type attribute is set to the value "Person" and the Name attribute is set to the value "J.S." in each copy of the data object at each site. In addition, each site 101, 102, and 103 maintains a version vector for the data object. Initially, the version vectors are identical (i.e., <1, 0, 0>) reflecting that each site has the same version of the data object. Each version vector has three elements, one for each site 101, 102, and 103. In the example depicted in FIG. 5, the first (leftmost) element of each version vector corresponds to site 101, the second (middle) element of each version vector corresponds to site 102, and the third (rightmost) element of each version vector corresponds to site 103.

At event 503 at site 101, a local change is made to site 101's copy of the data object. In particular, the Name property is changed from "J.S." to "John Smith". In accordance with step 310 of method 300, site 101's logical clock for the data object is incremented by a fixed value. In the example, site 101's logical clock in the version vector for the data object is incremented from 1 to 2.

In accordance with step 315 of method 300, at event 505, site 101 shares the change to its copy of the data object with site 102. In particular, an update is sent from site 101 to site 102. In one embodiment, the update includes an identifier of the data object, data representing the change made, and data representing site 101's version vector for the data object (e.g., <2, 0, 0>).

At event 507, the update sent from site 101 is received at site 102. In accordance with step 410 of method 400, the version vector for the data object received in the update <2, 0, 0> is compared against site 102's current version vector for the data object <1, 0, 0>. Such comparison reveals that sites 102's version vector happened before (is ordered before) site 101's version vector. Thus, the update received at site 102 reflecting the change made at site 101 does not conflict with site 102's version of the data object. In accordance with step 440 of method 400, site 102 incorporates the change received in the update into its local copy of the data object with the change received in the update superseding any differing properties of site 102's copy of the data object. In particular, the value of the Name property in site 102's copy of the data object is changed from "J.S." to "John Smith". In accordance with step 450 of method 400, Site 101's version vector for the data object received in the update is merged with site 102's version vector to produce a new version vector for the data object at site 102 of <2, 0, 0>.

At event 509, site 101's update is propagated by site 102 to site 103. In one embodiment, site 102 is configured to perform such propagation as part of a partially-meshed or cascading multimaster replication topology. In an alternative embodiment, instead of relying on site 102 to propagate the update, site 101 communicates the update to both site 102 and site 103 as part of a fully meshed multimaster replication topology. At event 511, site 103 receives the update and incorporates the update into its local copy of the data object and merges version vectors by performing steps similar to those performed by site 102 at event 507.

Event 513 and event 515 represent concurrent changes to the data object. In particular, at site 102 a Phone # property is added to the data object. At site 103, an Address property is added to the data object. In accordance with step 310 of method 300, site 102 and site 103 both increment their logical clock for the data object. At event 517, site 102 sends an update to site 103 reflecting the addition of the Phone # property. At event 519, site 103 sends an update to site 102 reflecting the addition of the Address property. Although not shown in FIG. 5, sites 102 and 103 may also communicate updates to other sites in the system (e.g., site 101). At event 521, site 102 receives the update sent from site 103 and detects the conflict. In particular, the version vector received in the update from site 103 (i.e., <2, 0, 1>) is not identical to, nor ordered before or after, the version vector for the object at site 102 (i.e., <2, 1, 0>). In accordance with step 420 of method 400, site 102 attempts to automatically deconflict the conflict based on a pre-specified set of heuristics and/or deconfliction rules. In the example of FIG. 5, site 102 compares its copy of the data object with the version of the data object received in the update and determines that the concurrent changes involve changes to non-overlapping properties. Thus, at event 512, site 102 determines that the conflict can be automatically deconflicting and updates its local copy of the data object accordingly. In particular, the Address property received in the update is added to site 102's local copy of the data object. Further, in accordance with step 430 of method 400, site 102's version vector for the data object is merged with site 103's version vector for the data object received in the update and the resulting version vector becomes the new version vector for the data object at site 102. Then, in accordance with step 435 of method 400, site 102 increments its logical clock in the version vector for the data object by one to produce a newe version vector for the data object at site 102 of <2, 2, 1>.

At event 523, site 103 performs a process similar to what site 102 performs at event 521.

Avoiding Needless Repetitive Updates

After event 521 at site 102 and after event 523 at site 103, site 102 and site 103 both have identical copies of the data object. However, site 102 and site 103 have different version vectors for the data object. In the example, site 102 has a version vector for the data object of <2, 2, 1> and site 103 has a version vector for the data object of <2, 1, 2>. In accordance with step 435 of method 400, site 102 and site 103 may send an update to each other reflecting their respective automatic deconfliction operations performed at events 521 and 523 respectively. When received by the other site, these updates will be detected as conflict. For example, site 102's version vector <2, 2, 1> is not identical, nor ordered before or after, site 103's version vector <2, 1, 2>. If no corrective action is taken, site 102 and site 103 will repeatedly and needlessly deconflict, increment their logical clocks for the data object, and send updates to each other even though both sites have identical copies of the data object.

In one embodiment, to avoid needless repetitive updates, at step 420 of method 400, after a conflict has been detected, a comparison is made between the version of the data object received in the update and the receiving site's version of the data object. If the two versions are identical, then only a merge of the two version vectors is performed (step 430). The receiving site's local copy of the data object is not changed and the receiving site's logical clock in the version vector for the data object is not incremented (i.e., steps 425 and 435 are not performed). In one embodiment, this comparison includes a property by property comparison between the two versions of the data object.

For example, returning to FIG. 5, at event 529, site 102 receives an update from site 103 indicating that site 103 added the Phone # property to its copy of the data object and including its current version vector for the data object of <2, 1, 2>. Upon receiving this update, site 102 detects a conflict because its version vector <2, 2, 1> is not identical to, nor ordered before or after, site 103's version vector <2, 1, 2>. Site 102 compares its version of the data object with the version of the data object received in the update from site 103. Upon determining that the versions are identical (i.e., both versions have the same properties with the same values), site 102 merges the two version vectors to produce a new version vector for the data object at site 102 of <2, 2, 2>. Site 103 performs a similar process at event 531 to arrive at the same version vector <2, 2, 2>. Now that both version vectors are identical, a conflict may not longer be detected and updates relating to the previous deconfliction no longer propagated by the sites.

Per-Link Set Version Vectors

In one embodiment, links connecting two data objects are versioned separately and independently from the data objects connected by the links. In particular, the set of links connecting two objects is associated with its own version vector separate from the versions vectors associated with the two objects. Each site maintains a version vector for each link set. Changes to a link set at a site including adding a link to the set or removing a link from the set result in the site incrementing its local logical clock for the link set and the site sharing the change to the link set with other sites. The versions vectors associated with copies of a link set at the sites can be used to detect and deconflict conflicts involving concurrent changes to two different copies of the same link set in a manner similar that described above for how per-object version vectors can be used to detect and deconflict conflicts involving concurrent changes to two different copies of the same data object.

Figure 6:
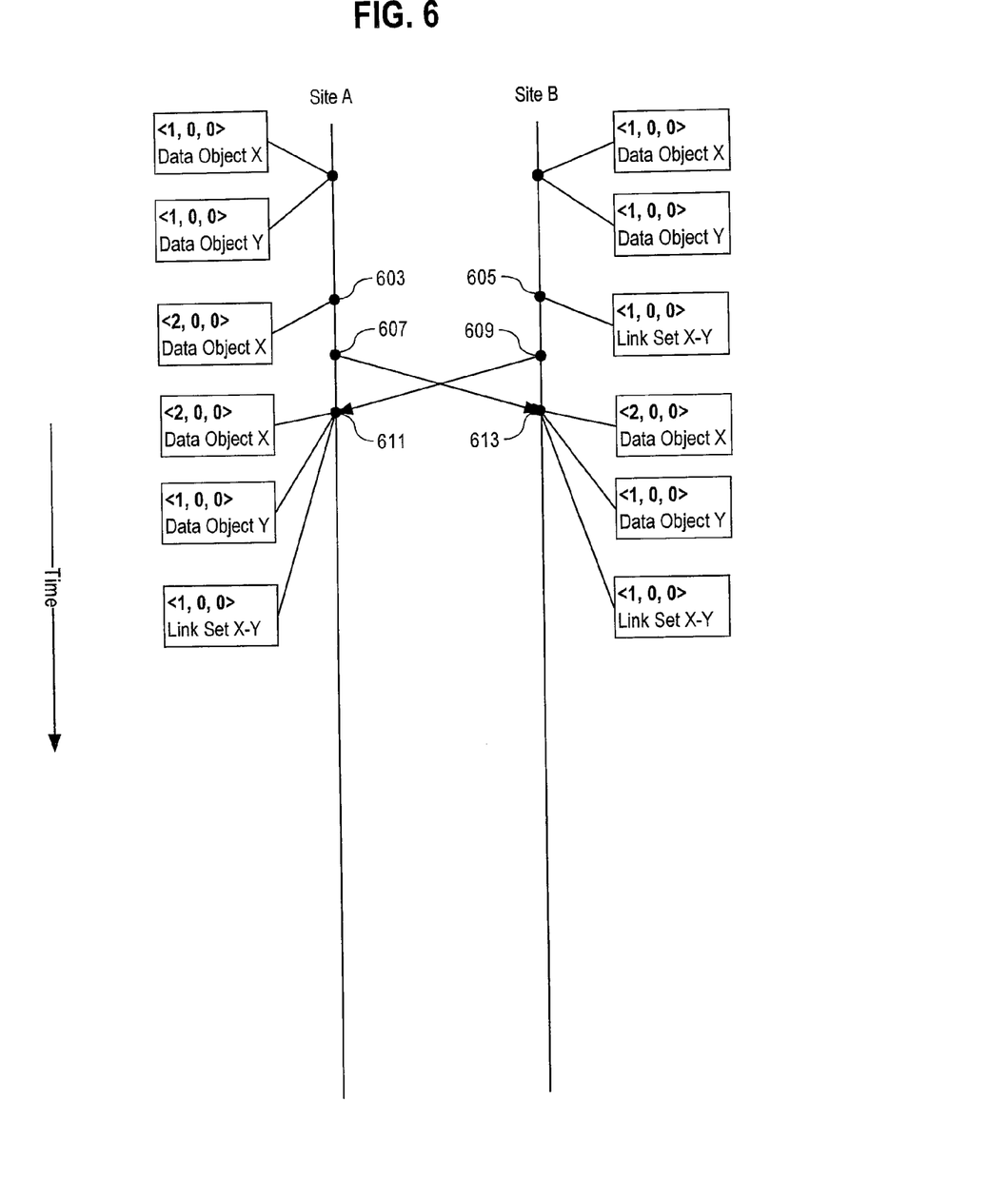
FIG. 6 illustrates an example of sharing data changes using per-link set version vectors according to an embodiment of the invention.

In addition, per-link set version vectors allow sites to automatically incorporate a concurrent change that includes a change to a link set and a change to a data object connected to another data object by the link set. For example, assume Site A and Site B have the same version of data object X and the same version of data object Y. Further, assume that Site A's version vector for data object X is identical to Site B's version vector for data object X and that Site A's version vector for data object Y is identical to Site B's version vector for data object Y. If a local change is made to data object X at Site A (e.g., by adding a new property), then Site A increments its local logical clock in the version vector for data object X and sends an update to Site B. Assume that, before Site B receives the update regarding the change to data object X at Site A, a local change is made at Site B linking data object X and data object Y. According to one embodiment, this causes Site B to increment its local logical clock in the version vector for the link set connecting data objects X and Y. However, in this case, Site B does not increment its local logical clock for either data object X or data object Y. Site B then sends an update to Site A reflecting the change to the link set between data objects X and Y. Upon receiving the update from Site B regarding the link set change, Site A incorporates the update such that data object X as modified by the change at Site A is linked to data object Y. Similarly, upon receiving the update from Site A regarding the change to data object X, Site B incorporates the update such that data object X as modified by the change at Site A is linked to data object Y. After the updates have been shared with each other, both Site A and Site B have identical copies of data object X and data object Y and identical copies of the links set connected data objects X and Y.

This example is illustrated in FIG. 6. As shown, initially Site A and Site B have the same version of data object X and the same version of data object Y. Events 603 and 605 represent concurrent changes. In particular, at event 603, a local change is made to data object X at Site A. For example, a change is made involving a property of data object X. Concurrently, at event 605, a local change is made at Site B linking data object X and data object Y. For example, if data object X and data object Y each represent a particular person, they may be linked through a Friend Of relationship. At event 607, Site A shares its change to data object X with Site B and includes its version vector for data object X<2, 0, 0> in its update. At event 609, Site B shares its change to the X-Y link set and includes its version vector for the X-Y link set <1, 0, 0> in its update. Both sites receive and incorporate each other's updates into their respective copies of the database at events 611 and 613. Note that in this example there is no detected conflict between the concurrent changes because the set of links connecting data objects X and Y is versioned separately and independently of the data objects X and Y themselves.

Using Per-Object Version Vectors to Detect Object Resolution Conflicts

As mentioned, some database systems may support "object resolution". Object resolution involves a user or an automated computing process determining that two or more separate data objects actually represent the same real-world entity and invoking a function of the database system so that the separate data objects are resolved together into a single data object. For example, assume there are two separate data objects, one having a Name property value of "John Smith", the other having a Name property value of "J. S.". A user may decide that these two data objects both represent the same real-world person. Accordingly, in a database system that supports object resolution, the user may invoke a function of the database system so that the two separate data objects are resolved to a single data object having a name property value of "John Smith" or "J.S." as selected by the user resolving the objects together.

In multimaster database systems employing asynchronous replication, it would be desirable to detect as a conflict concurrent changes that include an object resolution change. For example, assume that in database A, User 1 changed the hair color property of a data object representing a person named "J.S." from "brown" to "blonde". Further assume that before the hair color change made by User 1 can be propagated from database A to database B that User 2 changes database B by resolving together the data object representing "J.S." with another data object representing a person named "John Smith". It would be desirable for the multimaster database system to detect these two concurrent changes as a conflict as User 2 may not have decided to resolve "J.S." and "John Smith" together if User 2 had known that John Smith's hair color was changed by User 1. Similarly, User 1 may not have decided to change the hair color of "J.S." had User 1 known that User 2 resolved "J.S." and "John Smith" together.

In one embodiment, per-object version vectors are used to detect as a conflict a concurrent change involving an object resolution change. In particular, when a site resolves two or more objects together, the site increments each local logical clock at the site in each version vector for each data object resolved together. The resolution of the data objects is then shared as an update with other sites. The update includes the sharing site's resulting version vectors for each of the data objects that were resolved together.

According to one embodiment, a site receiving the update detects a conflict by comparing each version vector for each data object in the object resolution update with its version vector for the corresponding data object. If any of the version vectors are concurrent, then a conflict is detected. The resolution of the objects is incorporated into the receiving site's copy of the database only if each and every version vector received the update is identical to or ordered after the corresponding version vector at the receiving site.

As an example, assume data object X at site 101 of FIG. 1 has version vector <1, 0, 0> and data object Y at site 101 has version vector <1, 0, 0>. When data objects X and Y are resolved together at site 101, each logical clock for data objects X and Y at site 101 is incremented by a fixed value (e.g., one) giving a version vector at site 101 of <2, 0, 0,> for data object X and a version vector at site 101 of <2, 0, 0> for data object Y. When the object resolution change at site 101 is shared by site 101 with other sites (e.g., site 102 and site 103), the update includes data indicating the object resolution change (i.e., that data objects X and Y were resolved together) and site 101's version vectors for the data objects that were resolved together (e.g., <2, 0, 0> for data object X and <2, 0, 0> for data object Y). Further assume that a change concurrent with the object resolution change made at site 101 is made to data object X at site 102 thereby changing the version vector for data object X at site 102 from <1, 0, 0> to <1, 1, 0>. For example, a property of data object X is modified at site 102. Upon receiving the update sent from site 101 regarding the object resolution change, site 102 will detect these concurrent changes as a conflict. A conflict will be detected at site 102 because a version vector for at least one data object received in the object resolution update from site 101 is concurrent with the version vector for the data object at site 102. In particular, the version vector for data object X received in the update <2, 0, 0> is concurrent with the version vector for data object X at site 102 <1, 1, 0>. In response to detecting the conflict, site 102 may attempt to automatically deconflict the conflict according to pre-defined heuristics and/or deconfliction rules, or may require input from a user to deconflict the conflict.

Object Resolution Aware Happens After (RAHA)

In one embodiment, a site receiving an update involving a change to a data object that has been resolved together at the receiving site with one or more other data objects will be applied at the receiving site only if each and every data object resolved together at the receiving site is available in the update. If each and every data object is not available in the update, then the update may be placed in the receiving site's pending update queue. A process at the receiving site periodically scans the pending update queue for updates that, when combined, include each and every data object resolved together at the receiving site. If the scanning process discovers such a combination, then the updates may be applied atomically in combination at the receiving site.

For example, consider the following events that occur in system 100 of FIG. 1:

(1) Both site 101 and site 102 have copies of data objects X, Y, and Z each at version <1, 0, 0>. Further, data objects X, Y, and Z are resolved together at both site 101 and site 102.

(2) At site 101, data object X is unresolved from data objects Y and Z. Each version vector at site 101 is incremented such that each data object X, Y, and Z is now at version <2, 0, 0> at site 101.

(3) Site 101 sends an update to site 102 that includes data representing data object X at version <2, 0, 0> and data representing the resolution of data objects Y and Z each at version <2, 0, 0>.

(4) Site 102 receives the update from site 101 and places the update in its pending update queue. The update is placed in the pending update queue because neither data object X at version <2, 0, 0> nor the resolution of data objects Y and Z each at version <2, 0, 0> includes all the data objects in the resolution of data objects X, Y, and Z each at version <1, 0, 0> at site 102.

(5) A scanning process at site 102 scans the pending update queue for updates that, when combined, include each and every of the data objects X, Y, and Z resolved together at site 102. The scanning process finds the updates received from site 102 in the pending update for data objects X, Y, and Z and applies them to site 102's copy of the body data after which both site 101 and site 102 have data object X at version <2, 0, 0> unresolved from resolved data objects Y and Z, each at version <2, 0, 0>.

Per-Site Global Acknowledgement Version Vectors

In one embodiment, to aid in determining what changes should be shared with other sites in the system, each site maintains a single global acknowledgement version vector which the site periodically shares with other sites in the system. A site's global acknowledgement version vector reflects a merging of all version vectors for all changes successfully applied to the site's local copy of the shared body of data. When a sending site shares a change with a receiving site, the receiving system is guaranteed to have successfully already received all changes that are ordered before (i.e., happened before) the receiving site's global acknowledgement version vector. Thus, the sending site need not send those changes to the receiving site that are ordered before (i.e., happened before) the receiving site's global acknowledgement version vector.

In one embodiment, changes in the pending update queue at a site are shared with other sites even though the updates are pending and have not yet been deconflicted. This is done for correctness in systems in which the replication topology is cyclic and/or dynamic. For example, consider system 100 of FIG. 1 in which all three sites 101, 102, and 103 are configured to share changes with each other. Further consider the following events that occur in system 100:

(1) Site 101 sends to site 102 an update for data object A at version <1, 0, 0> and an update for data object B at version <1, 0, 0>.

(2) Concurrent with event (1), site 102 edits object A to version <0, 1, 0>.

(3) Site 102, upon receiving the update for object B a version <1, 0, 0,> from site 101, applies the update to its local copy of object B. Site 102, upon receiving the update for data object A at version <1, 0, 0> from site 101, places the update in a pending update queue at site 102.

(4) Site 102 sends to site 103 an update for data object A at version <0, 1, 0> and an update for data object B at version <1, 0, 0>.

(5) Site 103, up receiving the update for object B at version <1, 0, 0> from site 102, applies the update to its local copy of object B. Site 103, upon receiving the update for data object A at version <0, 1, 0> from site 102, applies the update to its local copy of object A. Site 103's global acknowledgement version vector is at <1, 1, 0> as a result of merging the version vector for data object A at version <0, 1, 0> and the version vector for data object B at version <1, 0, 0>.

In this example, if, at event (4), the update for data object A at version <1, 0, 0> in site 102's pending update queue is not also shared with site 103, then site 103 may never receive the update because site 103's global acknowledgment version vector indicates that site 103 has already received the update. Thus, according to one embodiment, site 102 at event (4) will also share with site 103 the update in its pending update queue for data object A at version <1, 0, 0>. This is so even though the update has not yet been deconflicted. In one embodiment, the pending update is also stored in site 103's pending update queue. In this situation, the conflict can now be deconflicted at either site 102 or site 103.

Implementing Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
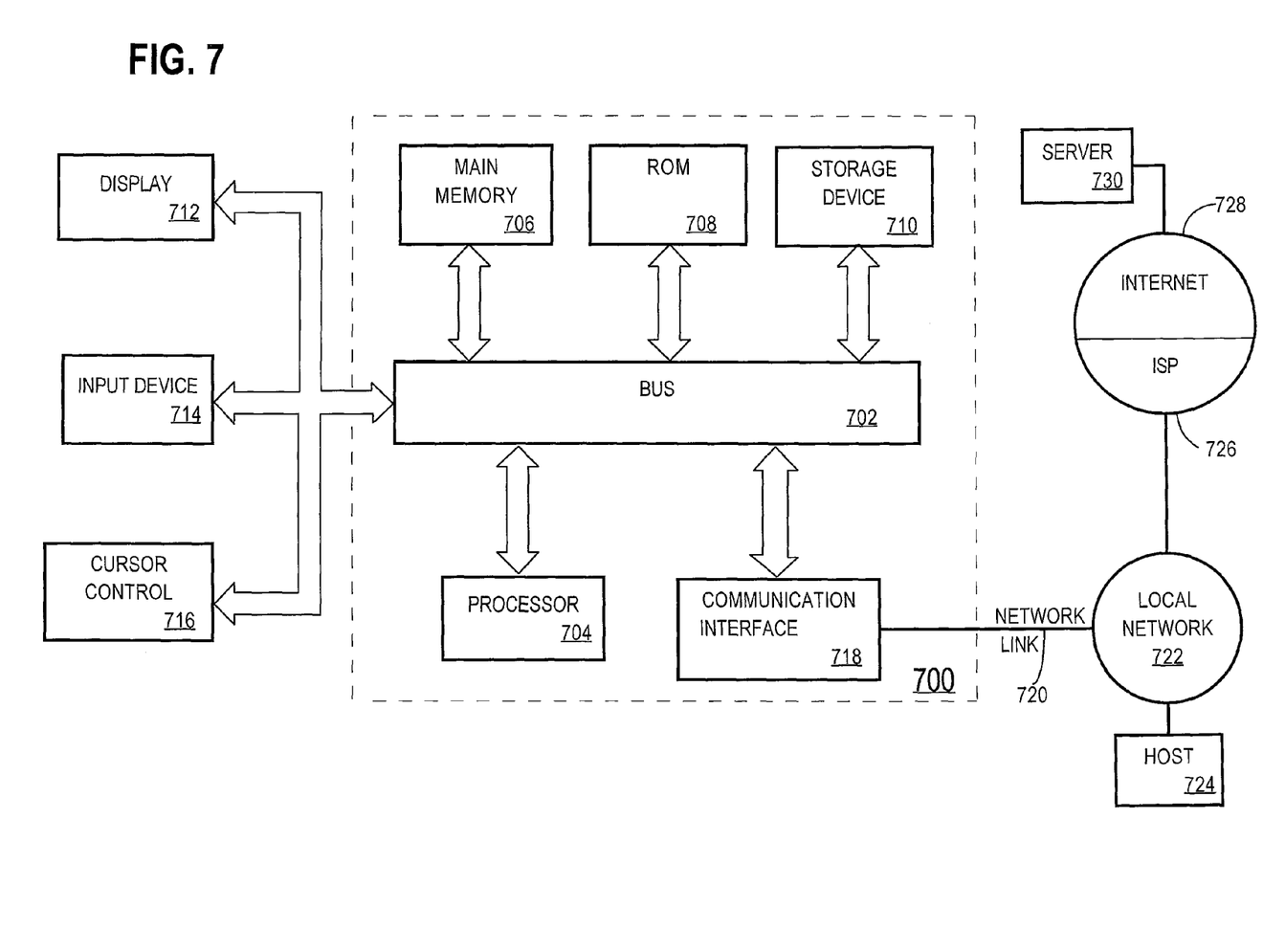
FIG. 7 illustrates a computer system with which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "non-transitory media" as used herein refers to any media that store data and/or instructions that cause a machine to operation in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a multimaster database system comprising a plurality of sites, a method for sharing and deconflicting data changes, the method comprising:
   at a first site of the plurality of sites, making a first change to a set of one or more links connecting two data objects by adding or removing one or more links from the set of links;
   wherein the set of links is associated at the first site with a first version vector for the set of one or more links;
   at a second site of the plurality of sites, making a second change to the set of links connecting the two data objects by adding or removing a link from the set of links;
   wherein the set of links is associated at the second site with a second version vector for the set of links;
   sharing the first change with the second site of the plurality of sites;
   receiving, at the second site, an update reflecting the first change to the set of links at the first site;
   wherein the update includes:
      an identification of the set of links,
      data reflecting the first change to the set of links at the first site, and
      the first version vector for the set of links;
   at the second site, comparing the first version vector for the set of links to the second version vector for the set of links to determine whether the first change to the set of links at the first set and the second change to the set of links at the second site are identical, ordered, or concurrent;
   wherein the method is performed by a plurality of computing devices.

2. The method according to claim 1, wherein the second change to the set of links is made at the second site before the first change to the set of links is made at the first site; and wherein the method further comprises determining, based on the comparing, that the first and second changes are ordered.

3. The method according to claim 1, wherein the second change to the set of links is made at the second site before the first change to the set of links is made at the first site; and wherein the method further comprises determining, based on the comparing, that the first and second changes are concurrent.

4. In a multimaster database system comprising a plurality of sites, a method for sharing and deconflicting data changes, the method comprising:

at a first site of the plurality of sites:
resolving two or more data objects together to produce a data object resolution change;
sharing the data object resolution change with one or more other sites of the plurality of sites;
at a second site of the plurality of sites:
receiving an update reflecting the data object resolution change made at the first site;
wherein the update includes:
an identification of each of the two or more data objects,
data that indicates that the two or more data objects were resolved together, and
for each of the two or more data objects, a version vector for the data object;
comparing, for each of one or more of the two or more data objects, the version vector for the data object received in the update to a version vector at the second site for the data object to determine whether the data object resolution change and a version at the second site of the data object are identical, ordered, or concurrent;
determining, based on the comparing, that the data object resolution change is concurrent with a version at the second site of at least one of the two or more data objects; and
in response to determining that the data object resolution change is concurrent with a version at the second site of at least one of the two or more data objects, determining that the data object resolution change conflicts with a version at the second site of at least one of the two or more data objects;
wherein the method is performed by a plurality of computing devices.

5. One or more non-transitory computer-readable media storing instructions which, when executed by a plurality of computing devices, cause performing a method for sharing and deconflicting data changes in a multimaster database system comprising a plurality of sites, the method comprising:
at a first site of the plurality of sites, making a first change to a set of one or more links connecting two data objects by adding or removing one or more links from the set of links;
wherein the set of links is associated at the first site with a first version vector for the set of one or more links;
at a second site of the plurality of sites, making a second change to the set of links connecting the two data objects by adding or removing a link from the set of links;
wherein the set of links is associated at the second site with a second version vector for the set of links;
sharing the first change with the second site of the plurality of sites;
receiving, at the second site, an update reflecting the first change to the set of links at the first site;
wherein the update includes:
an identification of the set of links,
data reflecting the first change to the set of links at the first site, and
the first version vector for the set of links;
at the second site, comparing the first version vector for the set of links to the second version vector for the set of links to determine whether the first change to the set of links at the first set and the second change to the set of links at the second site are identical, ordered, or concurrent.

6. The one or more non-transitory computer-readable media of claim 5, wherein the second change to the set of links is made at the second site before the first change to the set of links is made at the first site; and wherein the method further comprises determining, based on the comparing, that the first and second changes are ordered.

7. The one or more non-transitory computer-readable media of claim 5, wherein the second change to the set of links is made at the second site before the first change to the set of links is made at the first site; and wherein the method further comprises determining, based on the comparing, that the first and second changes are concurrent.

8. One or more non-transitory computer-readable media storing instructions which, when executed by a plurality of computing devices, cause performing a method for sharing and deconflicting data changes in a multimaster database system comprising a plurality of sites, the method comprising:
at a first site of the plurality of sites:
resolving two or more data objects together to produce a data object resolution change;
sharing the data object resolution change with one or more other sites of the plurality of sites;
at a second site of the plurality of sites:
receiving an update reflecting the data object resolution change made at the first site;
wherein the update includes:
an identification of each of the two or more data objects,
data that indicates that the two or more data objects were resolved together, and
for each of the two or more data objects, a version vector for the data object;
comparing, for each of one or more of the two or more data objects, the version vector for the data object received in the update to a version vector at the second site for the data object to determine whether the data object resolution change and a version at the second site of the data object are identical, ordered, or concurrent;
determining, based on the comparing, that the data object resolution change is concurrent with a version at the second site of at least one of the two or more data objects; and
in response to determining that the data object resolution change is concurrent with a version at the second site of at least one of the two or more data objects, determining that the data object resolution change conflicts with a version at the second site of at least one of the two or more data objects.

* * * * *